United States Patent [19]

Joffe

[11] 4,180,889

[45] Jan. 1, 1980

[54] MOLDS FOR FORMING HAMBURGER PATTIES AND OTHER COMESTIBLES

[76] Inventor: Edward J. Joffe, 940 Park Ave., Linden, N.J. 07036

[21] Appl. No.: 930,134

[22] Filed: Aug. 2, 1978

[51] Int. Cl.² ............................................. A22C 7/00
[52] U.S. Cl. ..................................... 17/32; 249/66 R
[58] Field of Search .................. 17/32; 249/66 R, 70, 249/74, 76, 127; 425/440, 442

[56] References Cited

U.S. PATENT DOCUMENTS

| | | | |
|---|---|---|---|
| 2,196,574 | 4/1940 | Wyman | 249/66 R |
| 3,348,279 | 10/1967 | Shoe | 425/440 |
| 4,057,874 | 11/1977 | Walker, Jr. | 17/32 |
| 4,076,207 | 2/1978 | Austin | 249/66 R |

Primary Examiner—Willie G. Abercrombie
Attorney, Agent, or Firm—Colton & Stone, Inc.

[57] ABSTRACT

A mold, such as a hamburger patty press, is of single piece molded plastic construction. The top wall of the mold has a U-shaped slot and grooves extending from the ends of the slot to the adjacent edges of the wall to form integral hinges permitting a portion of the mold to be swung upwardly.

7 Claims, 6 Drawing Figures

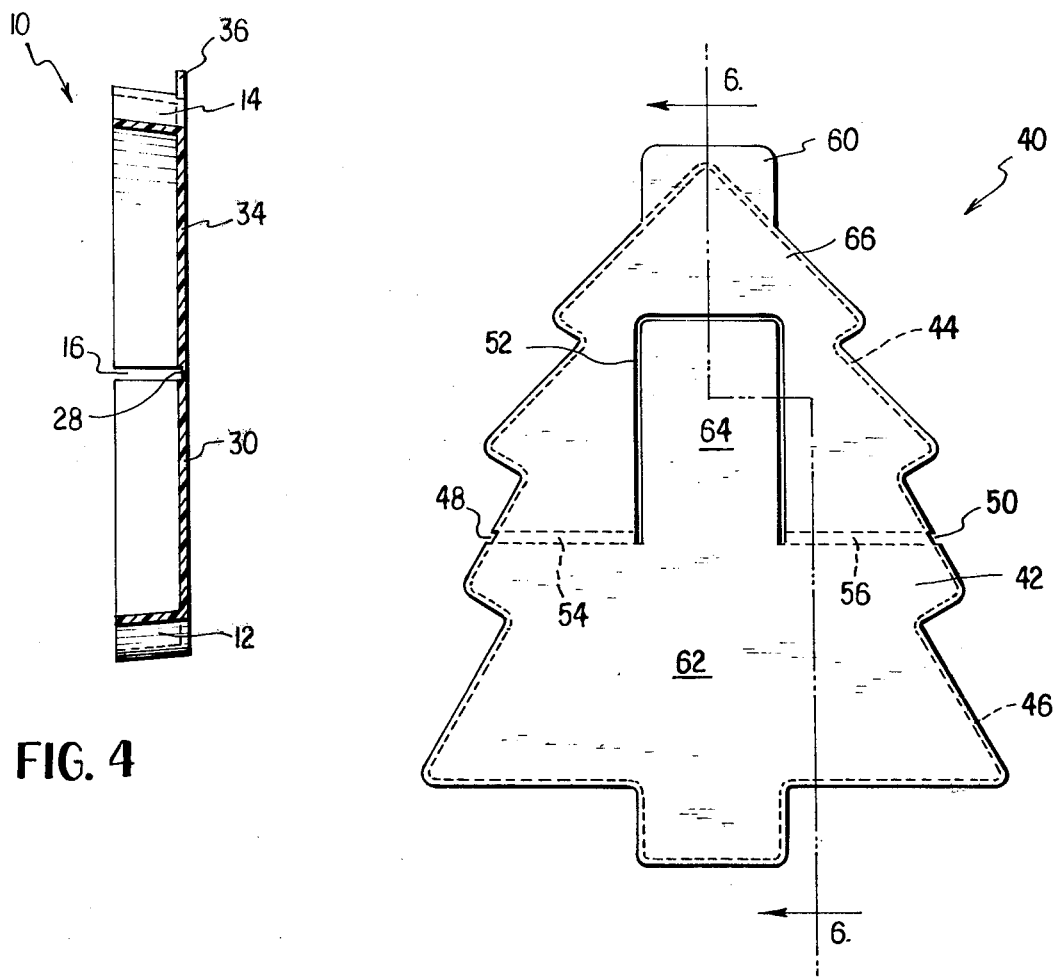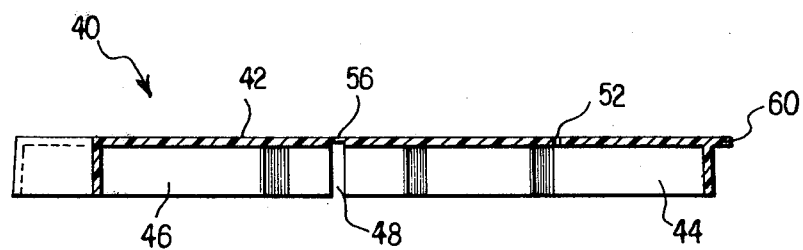

MOLDS FOR FORMING HAMBURGER PATTIES AND OTHER COMESTIBLES

The present invention relates to a mold for forming a comestible such as a hamburger patty or a cookie and, more particularly, to such a mold having means to facilitate the removal of the comestible after forming.

BACKGROUND OF THE INVENTION

A common method of making hamburger patties in the home is to press a quantity of ground meat in a mold of shallow cup-like configuration. In order to remove the formed patty from the mold, the prior art offers a number of solutions including the provision of removable top walls, as shown in Oestermeyer U.S. Pat. No. 2,722,713 and Glenny U.S. Pat. No. 2,892,211; rotatable cutters for freeing the formed patty from the mold walls, as shown in Manton U.S. Pat. No. 2,605,498 and Heuck U.S. Pat. No. Des. 191,367; and various types of ejector mechanisms, a typified by Catucco U.S. Pat. No. 2,820,423, Glenny U.S. Pat. No. 3,120,678 and Neri U.S. Pat. No. 3,934,308. All of these prior art devices are multiple component assemblies which contributes both to the manufacturing cost of the device and to the difficulty of cleaning the device after use.

In the forming of other food products such as cookies or biscuits in which a mold is used to shape the product, there is also a need for means to remove the product from the mold.

Among the objects of the invention are the provision of a mold for forming a comestible such as a hamburger patty which is of single piece construction and which incorporates means to facilitate removal of the formed patty from the mold. Other objects of the invention include the provision of such a mold which may be manufactured inexpensively, which is easy to use, and which, by virtue of its single piece construction, is cleaned without difficulty.

BRIEF DESCRIPTION OF THE INVENTION

The above and other objects of the invention which will become apparent hereinafter are achieved by the provision of a comestible mold formed of a food compatable plastic such as polypropolene and having a top wall and side walls extending from the periphery of the top wall, the side walls being notched at opposite sides of the mold and the top wall having a U-shaped slot the ends of which lie on the line connecting the side wall notches and grooves extending from the ends of the U-shaped slot to the adjacent side wall notches to provide reduced thickness regions functioning as hinges.

For a more complete understanding of the invention and the objects and advantages thereof, reference should be had to the following detailed description and the accompanying drawings wherein preferred embodiments of the invention are described and shown.

BRIEF DESCRIPTION OF THE DRAWINGS

In the drawings:

FIGS. 3 and 4 are transverse sectional views taken on the lines 3—3 and 4—4, respectively, of FIG. 1;

FIG. 5 is a top plan view of a second embodiment of the invention; and

FIG. 6 is a transverse sectional view taken along the line 6—6 of FIG. 5.

DETAILED DESCRIPTION OF THE PREFERRED EMBODIMENTS

Figure 1:
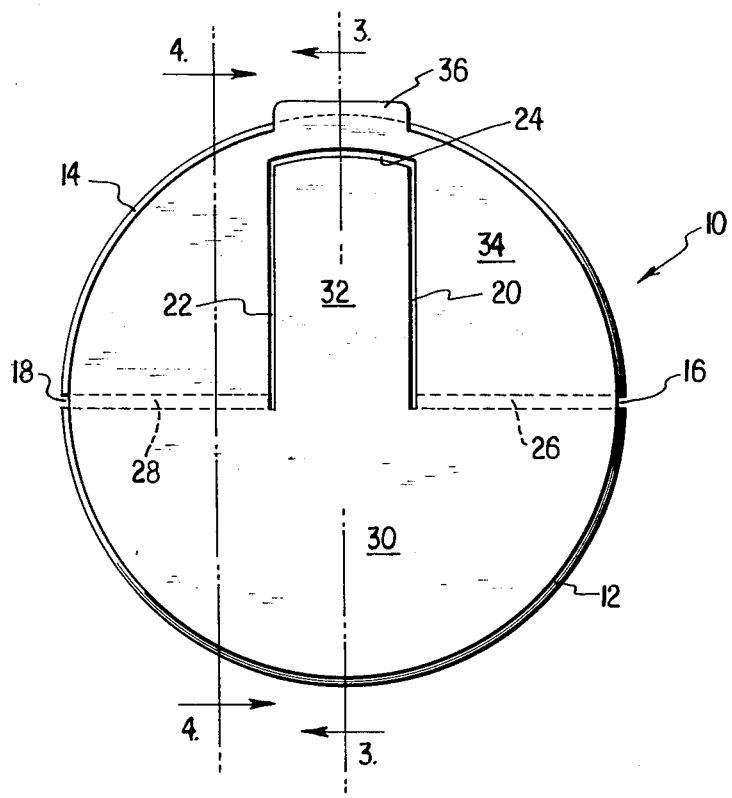
FIG. 1 is a top plan view of the hamburger press of the present invention.
Figure 2:
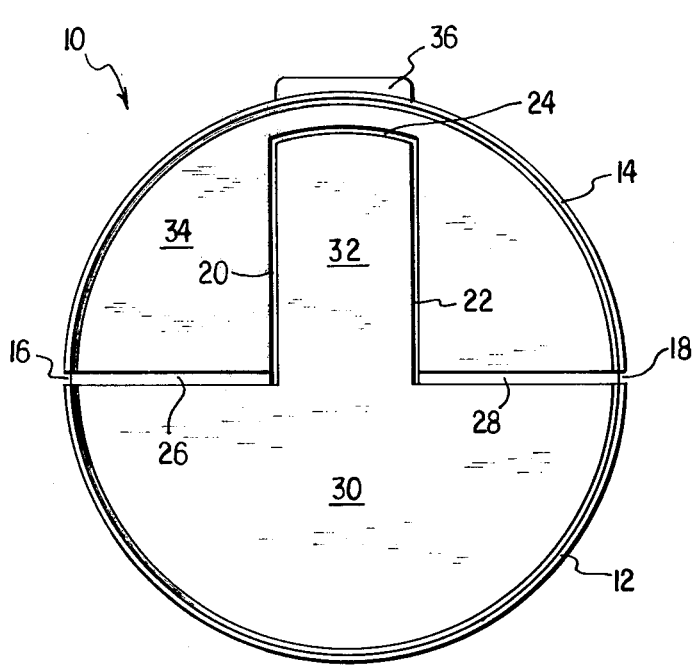
FIG. 2 is a bottom plan view of the hamburger press.

The embodiment of the invention illustrated in FIGS. 1-4 is a hamburger press of single piece construction, being molded of polypropylene or other suitable plastic material. The press is of shallow cup-like configuration having a top wall, circular in plan, and arcuate side walls 12 and 14 which, as is seen most clearly in FIG. 3, diverge at a small angle. The side walls 12 and 14 are separated from one another by diametrically opposed notches 16 and 18. A pair of slots 20 and 22 are provided in the top wall 10, the slots extending parallel to one another from and perpendicular to the diameter joining the notches 16 and 18 and equally spaced on opposite sides of the midpoint of this diameter. The slots 20 and 22 extend nearly to the side wall 14 and are connected by an arcuate slot 24. The lower face of the top wall 10 is provided with grooves 26 and 28 extending between the notch 16 and the inner end of the slot 20 and between the notch 18 and the inner end of the slot 22, respectively. The grooves and slots divide the top wall 10 into three sections; a solid semicircular section 30, a tab section 32, and a semicircular section 34 having a cut out portion of complementary configuration to the tab section 32. At the midpoint of the circumference of the section 34 there is provided a lifting tab or projection 36.

Figure 3:
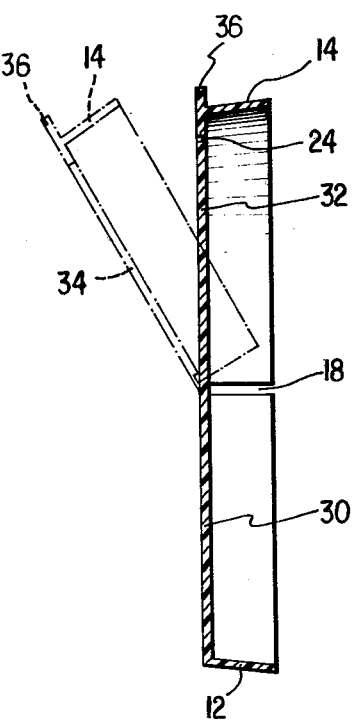

As can be seen from FIG. 3, the portions of the top wall 10 lying at the bases of the grooves 26 and 28 function as hinges. This arrangement allows the top section 34 to be swung upwardly relative to the semicircular section 30 and top section 32 along the diameter joining the notches 16 and 18.

In using the hamburger press, a quantity of ground meat sufficient to form a hamburger patty is placed in the mold as the mold rests on a countertop or other hard surface with the wall 10 against the surface and the side walls 12 and 14 extending upwardly. When the mold is filled, it is inverted and, by the application of hand pressure on the top wall 10, is pressed against the countertop to mold the ground meat into a hamburger patty. Removal of the formed patty from the press is facilitated by the combination of the tab section 32 and the hinged section 34. Thus, while applying finger pressure to the semicircular top section 30 and the tab section 32 to hold the mold against the countertop, the user engages the lifting tab 36 and lifts the edge of the notched top section 34 so that this section swings upwardly, hinging along the line of the grooves 26 and 28 to the open position shown in phantom outline in FIG. 4. As the section 34 is moved the tab section 32 serves to hold the patty so that it is not pulled up with the section 34. The fingers are now removed from the sections 30 and 32 and the mold lifted from the formed patty. The portion of the patty exposed when the section 34 was swung upwardly can be held down with finger pressure as the mold is removed. The slight taper of the side walls 12 and 14 contribute to the easy removal of the patty from the mold.

The embodiment of the invention shown in FIGS. 5 and 6 is a cookie cutter, designated generally by the reference numeral 40. The cutter has a top wall 42 and side walls 44 and 46 which extend continuously along the periphery of the top wall except for notches 48 and 50 located at opposite sides of the cutter. As in the previously described embodiment, a U-shaped slot 52 is provided in the top wall 42. The ends of this slot are located on the line between the notches 48 and 50 of the side walls. Grooves 54 and 56 are formed on the bottom surface of the top wall 42 extending outwardly from the ends of the slot 52 to the notches 48 and 50, respectively. A lifting tab 60 is provided at the upper end of the cookie cutter.

Like the previously described hamburger press, the cookie cutter 40 is molded of a plastic material such as polypropylene with substantially rigid walls and with the notches 54 and 56 of sufficient depth as the leave reduced thickness wall portions functioning as hinges. In order to remove a formed cookie from the cutter, the portion 62 of the cutter and the tab 64 are held down with finger pressure while the notched portion 66 is hinged upwardly, exposing a part of the formed cookie dough which may then be held with finger pressure while the entire cutter is lifted upwardly.

It will be understood that while preferred embodiments of the invention have been described and illustrated, the invention is not limited thereto. Reference should, accordingly, be had to the claims in determining the true scope of the invention.

What is claimed is:

1. In a mold for forming a comestible and having a substantially planar top wall and side walls projecting from said top wall and, together therewith, defining a mold cavity of the shape to which the comestible is to be formed, the improvement wherein said top and side walls are formed integrally of a plastic material, said side walls being notched at two points on opposite sides of the mold, said top wall having a substantially U-shaped slot therein the ends of which lie on a line extending between said two points, the portions of said top wall between the ends of said slot and the adjacent side wall notches being of reduced thickness whereby said portions function as hinges.

2. The improvement of claim 1 further characterized in that said mold is circular in plan and said notches are located at diametrically opposed points.

3. The improvement of claim 1 further characterized in that said U-shaped slot extends substantially to said side wall.

4. The improvement of claim 1 further characterized in that grooves are provided on the lower face of said top wall to provide said portions of reduced thickness.

5. The improvement of claim 1 further characterized in that a tab projects laterally from the periphery of said mold at a point adjacent to said U-shaped slot.

6. A hamburger patty press comprising a circular top wall and an annular side wall extending from the circumference of said top wall, said side wall being notched at two diametrically opposed points, said top wall having a substantially U-shaped slot the ends of which lie on the diameter joining said notches and are equally spaced from the midpoint thereof, said slot extending nearly to the periphery of said top wall, said top wall also having, on the lower face thereof, a pair of grooves, said grooves connecting said side wall notches with the adjacent ends of said slot.

7. The hamburger patty press of claim 6 wherein said press is of single piece molded plastic construction.

* * * * *